Sept. 12, 1967   L. G. SIMJIAN   3,340,789
DISPENSING MACHINE
Filed June 9, 1965
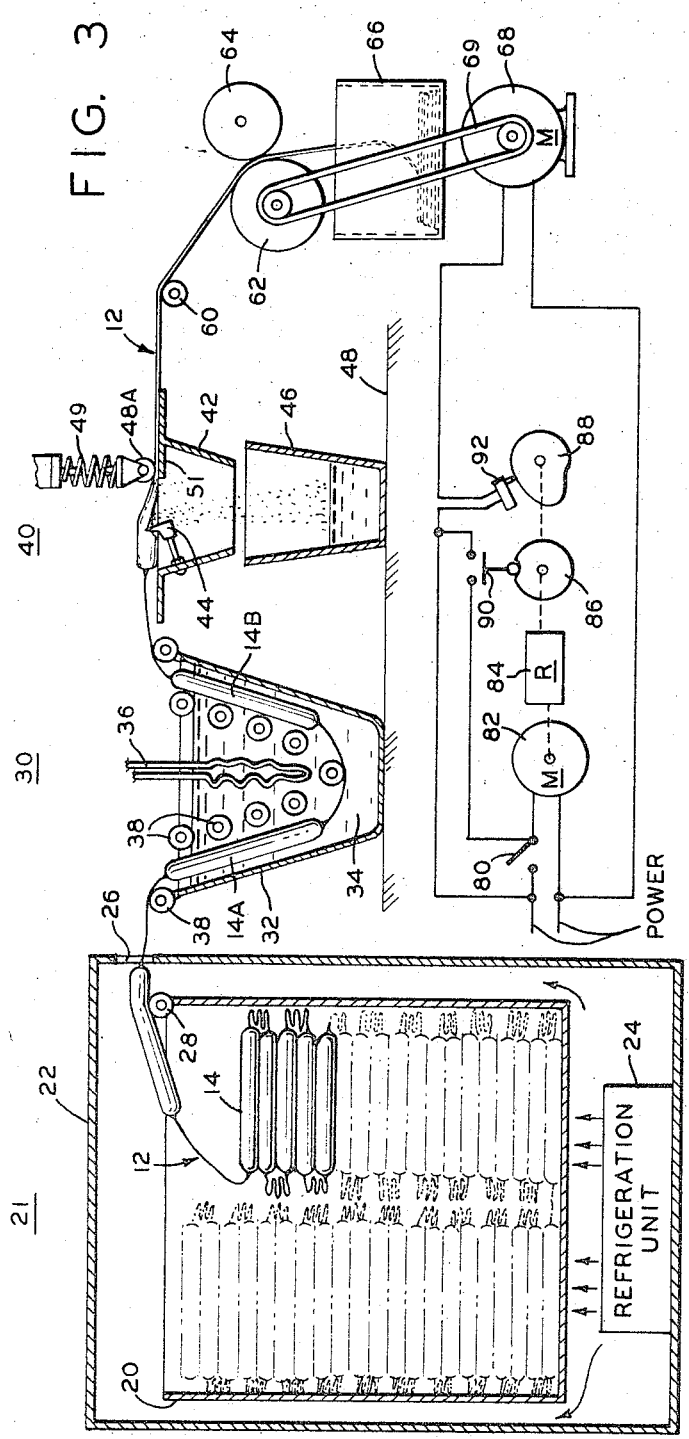
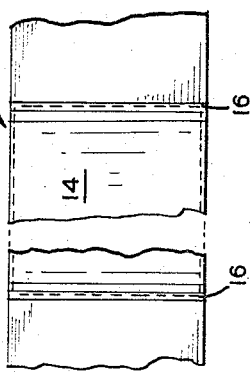
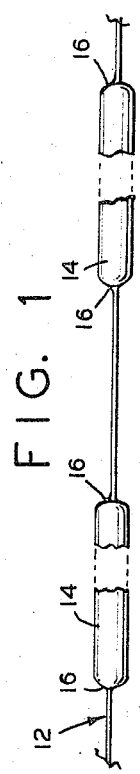
INVENTOR.
LUTHER G. SIMJIAN
BY
Ervin B. Steinberg
AGENT.

United States Patent Office
3,340,789
Patented Sept. 12, 1967

3,340,789
DISPENSING MACHINE
Luther G. Simjian, Greenwich, Conn., assignor to General Research, Inc., Greenwich, Conn., a corporation of Connecticut
Filed June 9, 1965, Ser. No. 462,612
6 Claims. (Cl. 99—352)

ABSTRACT OF THE DISCLOSURE

An apparatus for storing, conditioning and dispensing food or a similar substance contained in spaced compartments of a flexible band. The apparatus includes a refrigerated housing for storing the compartments, a conditioning, and an opening station through which compartments are conveyed by conveying means operating under the control of control means.

---

This invention refers to a means for dispensing articles and concerns a machine which is adapted to dispense a substance which is conditioned prior to dispensing. More particularly, this invention pertains to a machine for dispensing a substance, specifically food, which requires protection and preservation during storage, requires conditioning prior to consumption and wherein such conditioning is accomplished by the machine immediately preceding the dispensing operation in order to dispense ready-to-eat food.

While the above recitation broadly identifies the general field of invention, the instant machine when used with food packaged in a specific manner is particularly suited for dispensing meals which include such items as heated soups, mashed potatoes, cut vegetables, hash type meats and other fluent substances of food. To this end, the machine is provided with means for receiving and storing a compartmentized band or tubing, each compartment having therein an article of food, means for advancing the tubing and the associated compartments successively to a conditioning station and from there to an article removing station at which the individual compartments are opened and the article or substance removed for dispensing into a suitable container.

One of the principal objects of this invention is, therefore, the provision of a novel dispensing machine for food.

Another object of this invention is the provision of a dispensing machine adapted to receive food which is packaged in a specific manner, to condition the food for consumption and then to dispense the prepared food.

Still another object of this invention is the provision of a machine for dispensing meals, thereby being particularly suited for cafeterias, lunch rooms and other places involving large-scale mass feeding.

Further and still other objects of this invention will be apparent by reference to the following description when taken in conjunction with the accompanying drawings in which:

FIGURE 1 is a side view of the means for holding the article or substance to be dispensed;
FIGURE 2 is a top plan view of FIGURE 1, and
FIGURE 3 is a view of the general arrangement of the dispensing machine.

Referring now to the figures and FIGURES 1 and 2 in particular, there is shown a compartmentized tubing 12 which comprises, in the preferred example, a flexible plastic tubing 12, such as polyethylene. The tubing 12 contains a series of spaced apart elongated compartments or pockets 14, each being sealed at the area indicated by numeral 16. The compartments are spaced at equal distances and each compartment is filled with a suitable substance, such as food, e.g., soup, mashed potatoes, peas, meat, etc. By virtue of the seal 16 at either side, each compartment is completely sealed and the food therein is protected and preserved.

An alternative construction comprises a flat, flexible band having individual sealed pockets with food contained therein attached to the belt. The attaching may be accomplished by ultrasonic or heat sealing methods.

Irrespective whether the food containing pockets or compartments are an integral part of the tubing or attached to a supporting band, it shall be understtod that there may be 50 or 100 or more such compartments serially arranged with respect to one another so that the food is packaged in discrete portions.

Referring now to FIGURE 3, a compartmentized and filled tubing 12 having a plurality of compartments is shown fan-folded in a storage receptacle 20 which is housed in a larger storage enclosure 22 of the machine. The enclosure 22 may be considered the storage station 21 of the dispensing machine. A refrigeration unit 24 is provided to maintain the food within the individual compartments 14 refrigerated. The storage enclosure includes an aperture 26 by which the food carrying compartments leave the refrigerated storage area.

Numeral 30 refers to a conditioning station which serves to condition the food in the compartments after leaving the storage station. In the preferred arrangement, this conditioning station includes a trough-shaped container 32 filled with water 34 which is heated by an electric heating element 36. It should be noted that instead of a heated bath for conditioning the food within a pocket, dielectric heating means may be used for heating the food without deviating from the principle of conditioning the food for consumption while the food is still fully enclosed and sealed in a respective compartment 14.

As shown, the container 32 is shaped to accommodate simultaneously two compartments 14A and 14B, but it will be apparent that the container 32 may be enlarged to concurrently accommodate a larger quantity of such compartments which are conditioned and/or maintained in a conditioned state. A roller 28 serves to guide the tubing 12 and associated compartments 14 out of the storage station, and a plurality of rollers 38 guides the tubing and associated compartments through the conditioning station 30.

From the conditioning station 30, the compartments are advanced to the article removing station 40 which comprises a funnel-shaped structure 42 and a knife edge 44 positioned to engage the compartment disposed at that station. The knife edge opens the respective compartment and thereby frees the substance or article from the compartment as the compartment moves over the knife edge. A receptacle, such as a cup 46, is disposed on a supporting surface 48 and receives the prepared substance, for instance, hot soup, as illustrated. A pressure roller 48A biased by a spring 49 and pressing against a ledge 51 squeezes any remaining material from each pocket or compartment. A sensing switch may be provided to prevent the dispensing of food in the absence of a receptacle on the surface 48.

The empty tubing or band is then fed about a roller 60 and between a set of guide rollers 62, 64 to a waste receptacle 66 which is emptied periodically or completely replaced. The empty portion of the tubing is cut off during this servicing operation. A motor 68 drives via an endless belt 69 the roller 62 in order to advance a respective compartment 14 from the storage station 21 to the conditioning station 30 and form the conditioning station to the article or substance removing station 40.

Operation of the present dispensing machine may be visualized as follows: Switch 80 can be actuated manually, but preferably is a coin actuated switch, such as is well known in the vending industry. Upon the momentary closing of the switch 80, meter 82 is energized which drives a reduction gear box 84 and two control circuit cams 86 and 88. Rotation of the cam 86 closes a holding switch 90 to bypass switch 80 and thereby keep the motor 82 running for one complete cycle. As the motor 82 rotates, the cam 88 rotates and during its rotation closes switch 92 which causes operation of the motor 68 for a predetermined period of the cycle. Operation of the motor 68 advances the tubing 12, a compartment 14 is moved from the refrigerated area of the storage station to the conditioning station and another compartment is advanced from the conditioning station to the article removing station. At the same time, a corresponding empty tubing portion reaches the receptacle 66.

It will be apparent that the compartments 14 must be spaced equidistant from one another as must be the spaces between the stations. Also, the compartments and the spacing therebetween must be related to the dimensions of the machine stations in order that the band moves by the appropriate distance during each cycle.

While the knife 44 is shown as being mounted stationary, it will be apparent that a movable slitting device may be employed which temporarily is brought into engagement with the respective compartment at the station 40 in order to open the compartment and to free the substance confined therein.

Several further modifications of this basic arrangement are comprehended by this design. As illustrated, the band or tubing 12 is designed with spaced compartments 14, each having the same article of food, such as the soup illustrated. In an alternative arrangement, the compartments may be arranged in sets of three for example. The first compartment could contain mashed potatoes, a second compartment peas and a third compartment meat. Each closing of the switch 80 then would cause three consecutive advances of the band, thus causing three compartments to be opened.

A further alternative construction permitting the dispensing of a meal comprises the paralleling of bands, each having a particular food. By paralleling three or four bands, a corresponding number of different foods can be dispensed simultaneously. The storage station, conditioning station and article removing station are then enlarged to accommodate several bands disposed in parallel.

The material used for the compartments must be capable of withstanding heat, be flexible, and not affect the taste of the food. Plastic materials of this type are readily available and polyethylene, previously indicated, is only one of several choices.

The arrangement described heretofore overcomes the problem of storing and opening metal cans, emptying the food from metal containers and subsequently disposing the bulky, empty cans, problems heretofore never successfully solved in automated food dispensing machines. The inherent simplicity and benefits of the design disclosed heretofore will readily be apparent to those concerned with automated cafeteria arrangements.

While there has been described and illustrated a preferred embodiment of my invention and several modifications thereof, it will be apparent to those skilled in the art that several further modifications and changes may be made therein without deviating from the broad principle and intent of this invention which shall be limited only by the scope of the appended claims.

What is claimed is:

1. A dispensing machine for use with a flexible band having a series of sealed, spaced apart flexible compartments, each compartment filled with a substance which is to be dispensed, said machine including:

a storage means including refrigeration means for storing the compartments and having an aperture through which the compartments can be withdrawn from said storage means;

a trough shaped conditioning container adapted to contain a liquid disposed for receiving therein said compartments from said storage means for conditioning the substance in said compartments;

guide means associated with said conditioning container for guiding the received compartments through said container whereby the respective compartments travel in a path following generally the trough shape of the container, causing the substance to become conditioned by the liquid contacting the respective compartments;

a substance removing station disposed for receiving the compartments from said conditioning container, and including a knife for engaging the filled compartments and cutting the compartment open as a respective compartment is moved relative to said knife, whereby to release the substance from said compartment;

support means cooperating with said substance removing station for holding a container adapted to receive the substance released from an opened compartment;

a platform and a roller pressing thereagainst adapted to receive therebetween an opened compartment disposed at said removing station for squeezing the flexible side walls of the compartment so as to further remove substance remaining in the opened compartment;

further means including a roller driven by a motor disposed for receiving the band with opened compartments from said substance removing station whereby in response to rotation of said roller a respective compartment is advanced sequentially along a path from said storage means to said trough-shaped container and from said container to said substance removing station, and control means, cyclically operable, coupled to said motor for causing operation of said roller to cause rotation thereof for a predetermined time interval whereby to cause respective compartments to advance along said path.

2. A dispensing machine as set forth in claim 1, said conditioning container including means for heating water.

3. A dispensing machine as set forth in claim 1, said means for guiding the received compartments through said container comprise rollers disposed in said container to cause the compartments to be urged in a direction toward the wall of the container.

4. A dispensing machine as set forth in claim 1, said control means including cams.

5. A dispensing machine as set forth in claim 1, said further means including a receptacle for receiving and storing said band and opened compartments.

6. A dispensing machine as set forth in claim 1, said container being of a size to accommodate simultaneously a plurality of spaced compartments.

References Cited

UNITED STATES PATENTS

| 2,501,712 | 3/1950 | Choziesner | 99—357 |
| 2,990,973 | 7/1961 | Chazen | 99—357 X |
| 3,027,047 | 3/1962 | Johnson | 221—25 X |
| 3,048,070 | 8/1962 | Groves. | |
| 2,173,728 | 3/1965 | Sheer | 221—25 X |
| 3,181,732 | 5/1965 | Immermann et al. | 222—80 |
| 3,181,734 | 5/1965 | Ensign. | |
| 3,224,361 | 12/1965 | Ojelid | 99—357 X |
| 3,233,536 | 2/1966 | Ignelzi | 99—357 |
| 3,260,404 | 7/1966 | Critchell | 221—30 X |
| 3,276,352 | 10/1966 | Allen et al. | 99—352 |

FOREIGN PATENTS

| 1,359,015 | 3/1964 | France. |

BILLY J. WILHITE, *Primary Examiner.*